(12) United States Patent
Luo et al.

(10) Patent No.: US 10,846,142 B2
(45) Date of Patent: Nov. 24, 2020

(54) GRAPHICS PROCESSOR WORKLOAD ACCELERATION USING A COMMAND TEMPLATE FOR BATCH USAGE SCENARIOS

(71) Applicant: Intel Corporation, Santa Clara, CA (US)

(72) Inventors: Ning Luo, Shanghai (CN); Changliang Wang, Bellevue, WA (US)

(73) Assignee: Intel Corporation, Santa Clara, CA (US)

( * ) Notice: Subject to any disclaimer, the term of this patent is extended or adjusted under 35 U.S.C. 154(b) by 205 days.

(21) Appl. No.: 16/072,072

(22) PCT Filed: Feb. 23, 2016

(86) PCT No.: PCT/CN2016/074373
§ 371 (c)(1),
(2) Date: Jul. 23, 2018

(87) PCT Pub. No.: WO2017/143522
PCT Pub. Date: Aug. 31, 2017

(65) Prior Publication Data
US 2019/0042316 A1    Feb. 7, 2019

(51) Int. Cl.
*G06F 9/50*    (2006.01)
*G06F 40/205*    (2020.01)
(Continued)

(52) U.S. Cl.
CPC .......... *G06F 9/5061* (2013.01); *G06F 40/205* (2020.01); *G06T 1/20* (2013.01);
(Continued)

(58) Field of Classification Search
CPC ..... G06F 9/5061; G06F 40/205; H04N 19/40; H04N 19/42; H04N 19/436; H04N 19/44; G06T 1/20
See application file for complete search history.

(56) References Cited

U.S. PATENT DOCUMENTS 5,937,138 A      8/1999  Fukuda et al.
6,321,276 B1 *  11/2001  Forin .................... G06F 11/141
                                                          710/3
(Continued)

FOREIGN PATENT DOCUMENTS

CN          1197575        10/1998
CN         101179727         5/2008
(Continued)

OTHER PUBLICATIONS

International Preliminary Report on Patentability for PCT Application No. PCT/CN16/74373, dated Sep. 7, 2018.
(Continued)

*Primary Examiner* — Emerson C Puente
*Assistant Examiner* — Jonathan R Labud
(74) *Attorney, Agent, or Firm* — Green, Howard & Mughal LLP

(57) ABSTRACT

Techniques related to graphics processor workload acceleration are discussed. Such techniques may include combining multiple media tasks into one function call, providing a single batched media command set for the media tasks based on the one function call and a batched media command template, and performing the media tasks based on the single batched media command set to generate output media data.

23 Claims, 7 Drawing Sheets

(51) Int. Cl.
*G06T 1/20* (2006.01)
*H04N 19/40* (2014.01)
*H04N 19/42* (2014.01)
*H04N 19/436* (2014.01)
*H04N 19/44* (2014.01)

(52) U.S. Cl.
CPC ............ *H04N 19/40* (2014.11); *H04N 19/42* (2014.11); *H04N 19/436* (2014.11); *H04N 19/44* (2014.11)

(56) References Cited

U.S. PATENT DOCUMENTS

| | | | |
|---|---|---|---|
| 6,543,053 | B1 | 4/2003 | Li et al. |
| 7,605,825 | B1 * | 10/2009 | Lau ................... G06T 11/203 345/428 |
| 8,230,343 | B2 | 7/2012 | Logan et al. |
| 2002/0001307 | A1 * | 1/2002 | Nguyen ............ G01R 31/2812 370/386 |
| 2002/0114330 | A1 | 8/2002 | Cheung et al. |
| 2003/0158913 | A1 * | 8/2003 | Agnoli ................... H04L 29/06 709/219 |
| 2004/0158878 | A1 | 8/2004 | Ratnakar et al. |
| 2008/0303833 | A1 * | 12/2008 | Swift ................... G06T 15/005 345/505 |
| 2013/0057563 | A1 | 3/2013 | Persson |
| 2013/0170762 | A1 | 7/2013 | Marti et al. |
| 2013/0188723 | A1 | 7/2013 | Tanaka et al. |
| 2013/0188921 | A1 | 7/2013 | Kuriyama |
| 2013/0335443 | A1 | 12/2013 | Harper et al. |
| 2014/0010282 | A1 | 1/2014 | He et al. |
| 2014/0355948 | A1 | 12/2014 | Kosakai et al. |
| 2018/0007355 | A1 | 1/2018 | Borel et al. |
| 2019/0082108 | A1 | 3/2019 | Kinoshita et al. |

FOREIGN PATENT DOCUMENTS

| | | |
|---|---|---|
| CN | 105224410 | 1/2010 |
| CN | 102263889 | 11/2011 |
| CN | 102859492 | 1/2013 |
| CN | 103125119 | 5/2013 |
| JP | 2000350043 | 12/2000 |
| WO | 2015123840 | 8/2015 |

OTHER PUBLICATIONS

International Preliminary Report on Patentability for International Patent Application No. PCT/CN2015/080772, dated Dec. 14, 2017.
International Search Report & Written Opinion for International Patent Application No. PCT/CN2015/080772, dated Mar. 1, 2016.
International Search Report and Written Opinion for International Patent Application No. PCT/CN2016/074373, dated Nov. 21, 2016.

* cited by examiner

GRAPHICS PROCESSOR WORKLOAD ACCELERATION USING A COMMAND TEMPLATE FOR BATCH USAGE SCENARIOS

CLAIM OF PRIORITY

This Application is a National Stage Entry of, and claims priority to, PCT Application No. PCT/CN16/74373, filed on Feb. 23, 2016 and titled "GRAPHICS PROCESSOR WORKLOAD ACCELERATION USING A COMMAND TEMPLATE FOR BATCH USAGE SCENARIOS", which is incorporated by reference in its entirety for all purposes.

BACKGROUND

In media processing contexts such as video encoding, video decoding, video transcoding, or the like, a central processing unit (CPU) may communicate with a graphics processing unit (GPU) to launch a media task, media tasks, a media workload, or the like on the GPU. For example, such CPU/GPU communication may include a media driver at the CPU transforming upper level application program interface (API) calls to GPU commands. The GPU commands may be stored sequentially inside the GPU direct memory access buffer and the GPU may fetch the GPU commands via the DMA engine and launch the media tasks based on the GPU command instructions.

In such usage scenarios, each media task, such as an encode task or the like, from middleware or another software application (e.g., via the discussed API calls), may be converted to a single GPU command. Such techniques may be inefficient in terms of CPU usage and latency. For example, in such a one to one media task to GPU command usage scenario, the CPU may not have the opportunity to enter sleep states for sustained amounts of time.

It may be advantageous to perform media processing with higher efficiency in terms of CPU usage and latency and with low power usage, which may thereby extend device battery life. It is with respect to these and other considerations that the present improvements have been needed. Such improvements may become critical as the desire to perform media tasks on a wide range of devices becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
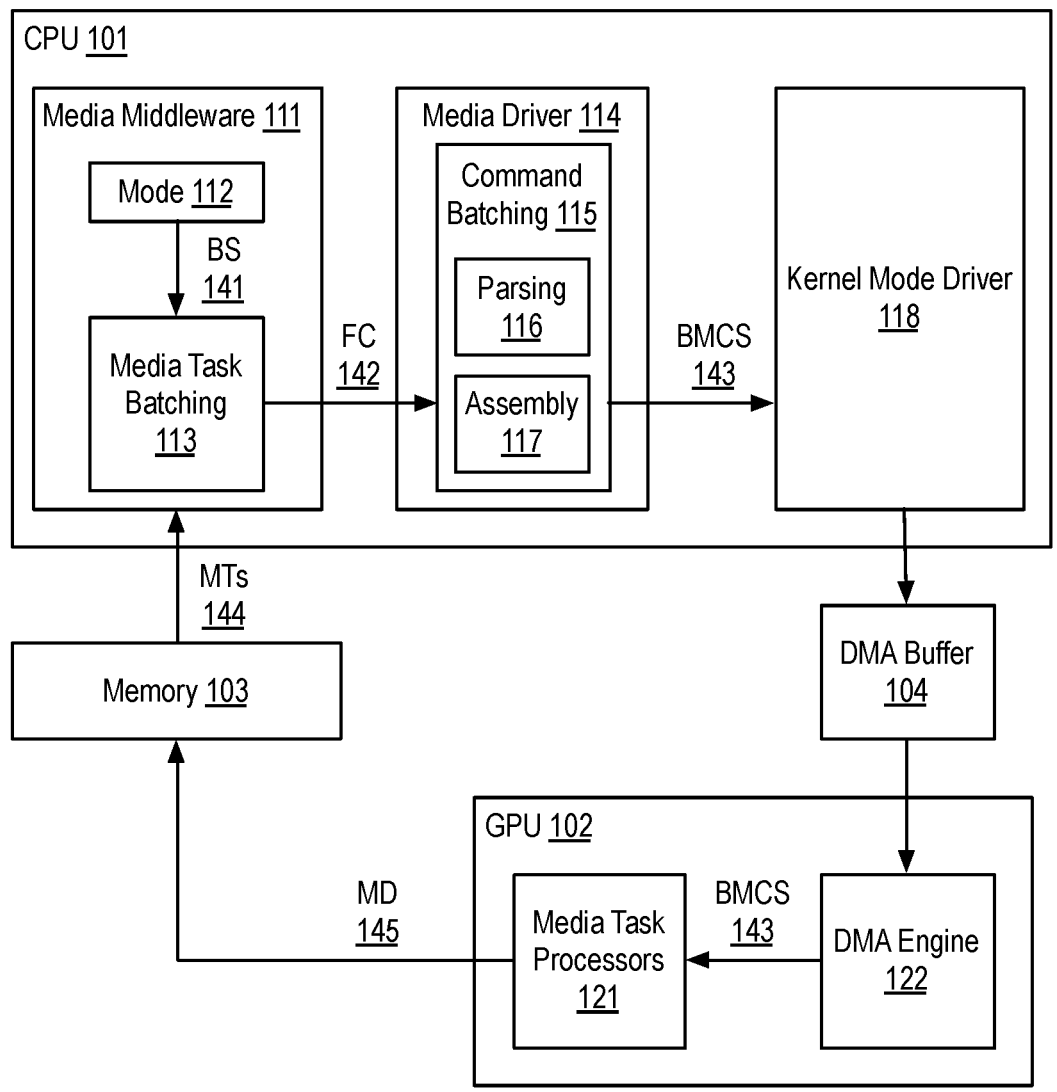
FIG. 1 illustrates an example system for batching media tasks.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "implementation(s)", "example(s)", "embodiment(s)", etc., indicate that the implementation, example, or embodiment described may include a particular feature, structure, characteristic, or the like, but every implementation, example, or embodiment may not necessarily include the particular feature, structure, or characteristic. Moreover, such phrases are not necessarily referring to the same implementation, example, or embodiment. Further, when a particular feature, structure, or characteristic is described in connection with an implementation, example, or embodiment, it is submitted that it is within the knowledge of one skilled in the art to affect such feature, structure, or characteristic in connection with other implementations, examples, or embodiments whether or not explicitly described herein.

Methods, devices, apparatuses, computing platforms, and articles are described herein related to graphics processor workload acceleration and, in particular, to efficiently batching media tasks for the graphics processor based on a batched media command template.

As described above, media tasks may be performed on a graphics processor based on graphics processor commands provided by a central processor. Such commands may be provided on a one by one basis such that each command is sequentially provided based on an associated media task such as an encode task or the like. Such technique may be inefficient in terms of CPU usage, latency, and power usage. As discussed herein, media tasks may be advantageously batched for submission to a graphics processor, which may launch and perform such media tasks.

In some embodiments, in a media task batching mode, multiple media tasks may be combined into one function call including the media tasks. For example, the media task batching mode may be entered based on the application requesting the media tasks. Such a media task batching mode may be advantageous in the context of slow motion video (e.g., where multiple frames may be batched for encoding), in the context of video transcoding (e.g., where continuous decoding and encoding tasks may be batched for coding), or the like. Such combining of multiple media tasks may be performed, for example, by media middleware or an application layer or the like.

Based on the single function call and a batched media command template, a single batched media command set may be generated. For example, a media driver may parse the single function call and assemble the single batched media command set based on the batched media command template. The single batched media command set may include a first portion (e.g., based on a command template base) including commands and/or parameters corresponding to all of the media tasks. For example, the first portion may include task independent information shared by the multiple media tasks. Such task independent information may be shared by all of the multiple media tasks and may include, for example, a frame dimension, an initial quantization parameter, a slice structure for a frame, a slice quantization parameter bit depth, bit rate control settings, a decoding bit depth, or the like. The second portion (e.g., based on a task specific parameters portion) may include task dependent parameters for particular media tasks or pointers to such task dependent parameters. For example, the second portion may include a task specific parameter or parameters associated with a particular media task or multiple such task specific parameter(s) associated with particular media tasks.

Such techniques may provide a batched media command template that may be used to generate a single batched media command set for the multiple media tasks. The single batched media command set may be submitted to and/or retrieved by a graphics processor and the graphics processor may perform the multiple media tasks based on the single batched media command set to generate output media data. As discussed, such media tasks may include encoding tasks, decoding tasks, transcoding tasks, or the like.

Such techniques may accelerate graphics processing workloads based on a command template for batched media tasks. For example, such media task batching may be selectively applied in particular usage scenarios to provide efficiencies for the usage of the graphics processor and the central processor requesting the workloads. Such batching usage scenarios may be characterized as intelligent batch usage scenarios or the like. Such batching usage scenarios may be effective for graphics processor power and performance optimization in usage scenarios requiring high speed encoding and/or decoding, for example. By buffering several continuous media tasks belonging to the same media processing session and submitting them to the graphics processor in batches or bursts, such batching techniques may improve parallelism between adjacent media tasks such that more continuous idle time is provided, which may allow the graphics processor and/or central processor to enter into deeper sleep states for longer periods of time (thereby saving power).

Such batching techniques may be used in any media processing contexts. In some embodiments, such batching techniques may be used in slow motion video recording for continuous encoding tasks. For example, in slow motion video recording implementations such techniques may be advantageously applied on mobile devices such as tablets, phones, or the like. In some embodiments, such batching techniques may be used in media server applications for continuous decoding and encoding (e.g., transcoding) tasks. For example, in continuous decoding and encoding implementations such techniques may be advantageously applied on server devices or in cloud computing devices or environments or the like.

Such media batching usage scenarios may share characteristics such as having several continuous media tasks belonging to the same media session that are submitted as a batch and as having media tasks that are homogeneous or mostly homogeneous such that most parameters for the media tasks are the same across the media tasks. Such characteristics may be leveraged using the batched media command template structures discussed herein. For example, the generation of a single batched media command set as discussed herein may include a one time parameter parsing, command set assembly, and submission of such batched media tasks.

FIG. 1 illustrates an example system 100 for batching media tasks, arranged in accordance with at least some implementations of the present disclosure. As shown in FIG. 1, system 100 may include a central processing unit 101, a graphics processing unit 102, a memory 103, and a direct memory access (DMA) buffer 104. Furthermore, central processing unit 101 may include or implement media middleware 111 having a mode module 112 and a media task batching module 113, a media driver 114 having a command batching module 115 that includes a parsing module 116 and an assembly module 117, and a kernel mode driver 118. Graphics processing unit 102 may include or implement any number of media task processors 121 and a direct memory access (DMA) engine 122. In some examples, central processing unit 101, graphics processing unit 102, memory 103, and direct memory access buffer 104 may be implemented as a system on-chip (SoC). Direct memory access buffer 104 may be implemented by any suitable memory such as via memory 103, via shared memory of central processing unit 101 and/or graphics processing unit 102 or as a separate memory module or device.

System 100 may be implemented via any suitable device such as, for example, a server, a cloud computing resource, a personal computer, a laptop computer, a tablet, a phablet, a smart phone, a digital camera, a gaming console, a wearable device, a display device, an all-in-one device, or the like or platform such as a server platform or a mobile platform or the like. For example, as used herein, a system, device, computer, or computing device may include any such device or platform. Furthermore, system 100 may be implemented or utilized in a variety of contexts such as a slow motion video recording context, a video transcoding context, or the like.

As shown, central processing unit 101 may receive, via memory 103, media tasks (MTs) 144 for processing. Media tasks 144 may include any suitable media tasks and data structures associated therewith. For example, media tasks 144 may include frames of video for encoding (e.g., frames of slow motion video for encoding), a bitstream or portions of a bitstream for decoding or transcoding, or the like. As shown, in some examples, media tasks 144 may be received via memory 103. In other examples, media tasks 144 may be received from other modules, processing units, hardware, or the like of system 100. For example, frames of video for encoding may be received from a camera framework, a camera module, an image preprocessing module, a decode module, or the like. Such video frames may include any suitable image or video data such as YUV (e.g., luma-chrominance-chrominance) data or data in any suitable color space such as the red-green-blue (RGB) color space or the like. In other examples, a bitstream or portion of a bitstream or the like may be received via a communications module, a remote memory storage, or the like. Such a bitstream may have any suitable format such as a standards compliant bitstream format or the like.

Media middleware 111 as implemented by central processing unit 101 may receive media tasks 144 and media middleware 111 may generate a single function call (FC) 142 based on some or all of media tasks 144 responsive to batch signal (BS) 141 as provided by mode module 112. For example, batch signal 141 may be any suitable signal, flag, bit indicator, or the like that indicates batching is to be provided for media tasks 144. For example, batch signal 141 may indicate a media task batching mode for system 100. Mode module 112 (or any suitable component) of media middleware 111 may generate batch signal 141 using any suitable technique or techniques. For example, batch signal 141 may be generated based on an application mode, application type, or the like associated with or corresponding to media tasks 144. Batch signal 141 may be generated by media middleware 111, for example, based on a usage scenario (e.g. a media processing task being performed) and/or based on other criteria such as a low power mode of system 100, a computing resource usage level of central processing unit 101 and/or graphics processing unit 102, or the like. In usage scenarios where batching may be disadvantageous, batch signal 141 may indicate no batching or may not be asserted or the like.

Media middleware 111 may generate single function call 142 using any suitable technique or techniques. For example, in a media task batching mode as indicated by batch signal 141, media middleware 111 may combine multiple media tasks of media tasks 144 to generate function call 142. For example, media middleware 111 may generate function call 142 based on the media processing task to be performed. Function call 142 may have any suitable format and may include any suitable data structure or information to provide a function call such as one or more commands, one or more parameters, data for processing (e.g., frames or bitstream data), pointers to such data for processing, or the like. Furthermore, media middleware 111 may include any suitable application or the like for providing function call 142. For example, media middleware 111 may be characterized as media software, a media framework, or the like. As shown, media task batching module 113 of media middleware 111 may provide (e.g., submit) function call 142 to media driver 114.

For example, media middleware 111 may, for each set of tasks to be batched, buffer multiple media tasks of media tasks 144, combine the buffered media tasks, and submit the combined media tasks to media driver 114 in one (e.g., a single) specific function call 142. The number of media tasks combined via media middleware 111 may be any suitable number of media tasks such as two or more media tasks. In an embodiment, function call 142 includes four media tasks. In an embodiment, function call 142 includes eight media tasks. In an embodiment, the number of media tasks included in function call 142 may be based on an application or usage scenario being provided by media middleware 111. For example, in the context of slow motion video processing, the number of media tasks (e.g., video frames for encoding) may be the ratio of the frame rate of the slow motion video to the frame rate of standard video processing. For example, if the standard frame rate is 30 fps (frames per second) and the slow motion frame rate is 120 fps, the number of media tasks combined for each function call may be 120/30=4 media tasks. If the slow motion frame rate is 240 fps, the number of media tasks combined for each function call may be 240/30=8 media tasks, and so on.

The number of media tasks combined in each function call may be characterized as a batch depth, batch size, or the like. Such a batch depth may also be provided to media driver 114 from media middleware 111 as a portion of function call 142 or separately from function call 142. For example, a batch depth (e.g. the number of media tasks in the batch), N, may be provided to media driver 114 as a processing parameter from media middleware 111.

Media driver 114, via command batching module 115 (or any suitable component of media driver 114), may generate a single matched media command set (BMCS) 143 based on function call 142. Batched media command set 143 may be generated using any suitable technique or techniques and may include any suitable data structure or the like for providing multiple media tasks to graphics processing unit 102 via single command set. For example, media driver 114 may provide parameters to a media command set template to generate batched media command set 143.

In an embodiment, batched media command set 143 may be generated based on a batched media command template and function call 142. For example, the batched media command template may provide a template for batching commands corresponding to media tasks into a command set such that the command set may be submitted to graphics processing unit 102 for processing. In an embodiment, the batched media command template may include a command template base portion and a task specific parameters portion. The command template base portion may include a template base for the tasks in the batch such that the command template base portion provides a command or a set of commands to launch the batched workload. Such commands may provide fields that may be filled or populated with parameters common to all tasks of the workload. Such task independent parameters (e.g., parameters common to all media tasks of the batch) may include any suitable parameters that are common among all (or most) of the media tasks being batched. For example, the task independent parameters may include a frame dimension, an initial quantization parameter, a slice structure for a frame, a slice quantization parameter bit depth, bit rate control settings, a decoding bit depth, or any other parameter(s) common to all of the media tasks in the batch.

The task specific parameters portion of the batched media command template may provide a template for providing task specific parameters (e.g., parameters specific to one of the batched media tasks), pointers to such task specific parameters, or the like. For example, one or more of the media tasks in the current batch may include additional parameters with respect to those provided in the command template base portion of the batched media command template. Such additions may be provided using any suitable technique or techniques and they may be characterized as task specific parameters, additional parameters, per media task delta, or the like. In an embodiment, the task specific parameters portion of the batched media command template may include pointers to the task specific parameters. In an embodiment, the task specific parameters include input/output buffer graphics address for particular media tasks (e.g., a location where data to be processed may be accessed). As discussed, the task specific parameters may include a parameter or parameters additional to those provided in the command template base portion. In another embodiment, the task specific parameters portion may include an update or change to the parameters provided in the command template base portion. For example, if an initial quantization parameter is not provided in the command template base portion, a quantization parameter for each frame of the media tasks may be provided in the task specific parameters portion. In another example, a quantization parameter may be provided in the command template base portion. However, for a particular media task of the media tasks, the quantization parameter may be changed or replaced or the like.

As discussed, media driver 114 may generate single batched media command set 143 based on function call 142. In an embodiment, parsing module 116 of command batching module 115 of media driver 114 may parse the parameters of function call 142 and assembly module 117 of command batching module 115 of media driver 114 may assemble the parsed parameters based on the media command template to generate batched media command set 143. For example, a single batched media command set 143 may provide a single filled command template for the discussed N media tasks in the batch. In an embodiment, media driver 114 may convert high level parameters as received via function call 142 to direct memory access commands provided by batched media command set 143. Media driver 114 may include any suitable driver, software or the like. For example, media driver 114 may be characterized as a driver, a graphics driver, a user mode driver, or the like.

As shown, graphics processing unit 102 may retrieve or receive batched media command set 143. For example, kernel mode driver 118 may provide batched media command set 143 to direct memory access buffer 104. In some examples, kernel mode driver 118 may optionally perform media object synchronization and provide batched media command set 143 to direct memory access buffer 104. Graphics processing unit 102 may, via direct memory access engine 122, fetch or retrieve batched media command set 143 from direct memory access buffer 104 and provide batched media command set 143 to one or more media task processors 121.

Media task processors 121 may launch and perform media tasks associated with each media task provided via batched media command set 143 to generate output media data (MD) 145. As discussed, such media tasks may include video encoding, video decoding, video transcoding, or the like. Media task processors 121 may include any suitable processor or processors such as dedicated circuitry for video encoding, video decoding, video transcoding, or the like. Media data 145 may include any suitable media data. For example, in the context of media tasks 144 including frames for video encoding, media data 145 may include encoded bitstream data. In the context of media tasks 144 including a bitstream or bitstream portions or the like, media data 145 may include decoded video frames (e.g., in decoding contexts) or a bitstream or bitstream portion having a different format or following a different standard or the like with respect to media tasks 144 (e.g., in transcoding contexts).

As shown, in some examples, graphics processing unit 102 may provide media data 145 to memory 103. In other examples, graphics processing unit 102 may provide media data 145 to another component or module or the like of system 100. For example, in the context of media data 145 being a bitstream, the bitstream may be an H.264 advanced video coding compliant bitstream, an H.265 high efficiency video coding compliant bitstream, or the like. The bitstream may be further processed using any suitable technique or techniques. For example, the bitstream may be provided to media driver 114 where it may be combined with encoded audio to generate a packetized elementary stream or the like. Furthermore, the bitstream may be provided to a local or remote display for decoding and presentment, transmitted to a remote device for storage or display, or the like. In the context of media data 145 being video frames or the like, the video frames may be saved to a frame buffer, provided to a local or remote display for presentment, transmitted to a remote device for storage or display, or the like.

Figure 2:
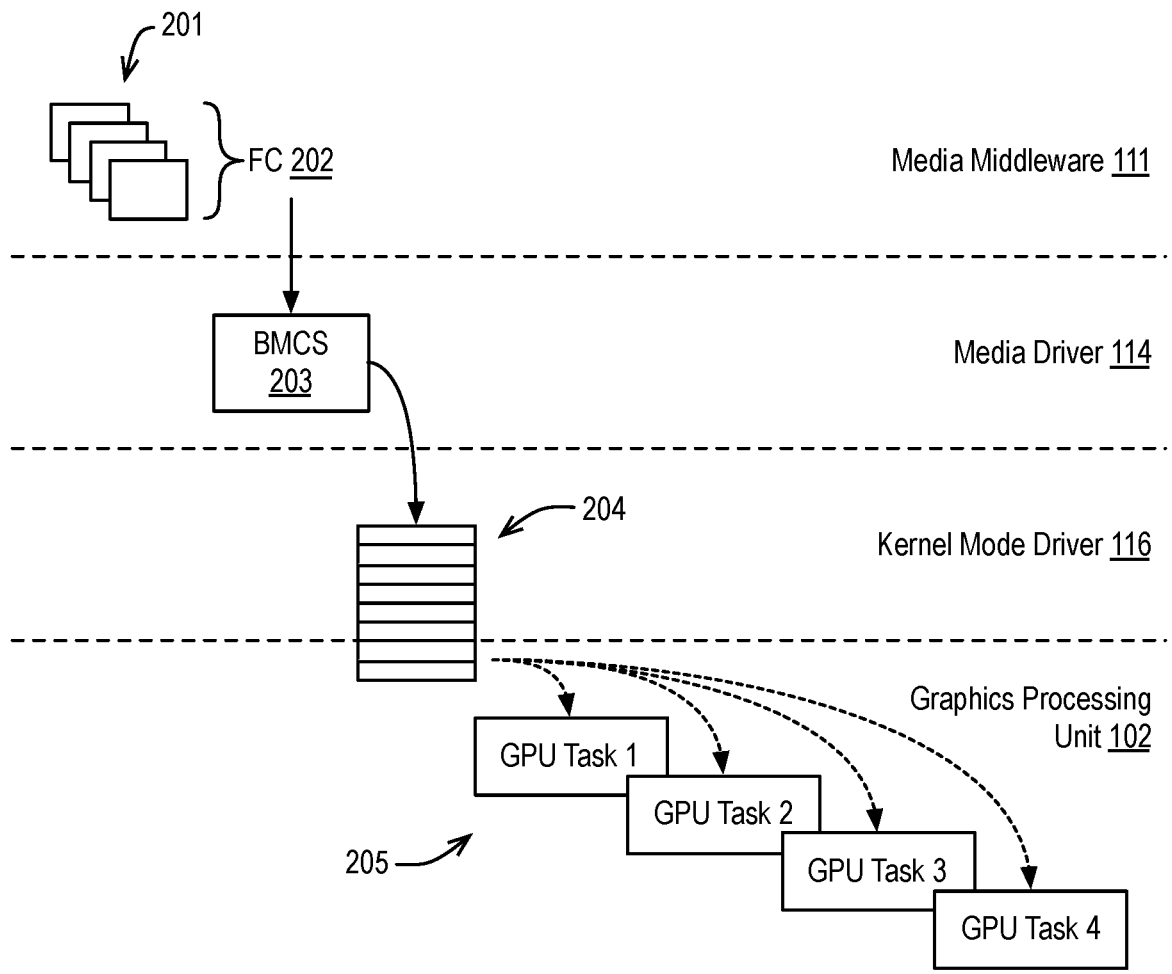
FIG. 2 illustrates an example sequence diagram for launching batched media tasks using a media command template.

FIG. 2 illustrates an example sequence diagram 200 for launching batched media tasks using a media command template, arranged in accordance with at least some implementations of the present disclosure. As shown in FIG. 2, media tasks 201 such as frames of video for encoding in the example of sequence diagram 200 may be received or provided for media processing. As discussed with respect to FIG. 1, media tasks 201 may be received from a camera module, a preprocessing module, a memory, or the like. Although illustrated with respect to frames of video for coding, media tasks 201 may be any suitable media task such as a bitstream for decoding or transcoding or the like. Media tasks 201 may be characterized as batched media tasks (e.g., batched encode tasks, batched decode tasks, batched transcode tasks), batched tasks, or the like. For example, media middleware 111 may determine whether or not to apply batch processing based on the particular usage scenario (e.g., application being processed) and/or other criteria such as the usage rate of the central processing unit, graphics processing unit, memory, or the like.

As shown, media middleware 111 (e.g., as implemented via a central processor such as central processing unit 101), when processing in batch processing mode, may combine media tasks 201 to generate a function call 202. For example, for each batch of media tasks, media middleware 111 may buffer and combine the media tasks to generate function call 202. Function call 202 may be submitted to media driver 114 (e.g., as implemented via a central processor such as central processing unit 101). As discussed, function call 202 may be a single specific function call for media tasks 202. For example, function call 202 may provide a one time submission for batched media tasks. Furthermore, function call 202 may include a batch depth, N, indicating a number of media tasks in function call 202. Alternatively, the batch depth may be provided separately from function call 202.

Media driver 114 may receive function call 202 and media driver 114 may generate a single batched media command set (BMCS) 203 based on function call 202. For example, media driver 114 may switch to a command template mode based on receiving function call 202 and/or receiving a signal of batch processing. Batched media command set 203 may be generated using any suitable technique or techniques and batched media command set 203 may include any suitable data structure as discussed herein. For example, media driver 114 may convert high level parameters received via function call 202 to direct memory access level commands as provided by batched media command set 203. In an embodiment, media driver 114 may parse the parameters passed via function call 202 from media middleware 111 and media driver 114 may generate or assemble a single batched media command set 203 for the N media tasks provided via function call 202 based on a batched media command template. For example, single batched media command set 203 may be generated based on the media command template and the parsed parameters. As shown, batched media command set 203 may be passed to graphics processing unit 102 via kernel mode driver 118.

For example, kernel mode driver 118 may optionally perform synchronization and kernel mode driver 118 may pass command set 204 to graphics processing unit 102 through a direct memory access buffer. Command set 204 may have the same or different structure with respect to batched media command set 203 and command set 204 may provide a batched media command set to graphics processing unit 102. Graphics processing unit 102 may receive command set 204 and may perform the media tasks associated with media tasks 201. For example, graphics processing unit 102 may fetch command set 204 via a direct memory access engine and graphics processing unit 102 may launch corresponding media tasks 205. Media tasks 205 may be performed by graphics processing unit 102 using any suitable technique or techniques. In an embodiment, media tasks 205 or portions thereof may be performed in parallel by graphics processing unit 102.

Using such a media command template structure, media driver 114 may launch a batch or set of tasks with a single parameter parsing, command assembly, and submission. Such batching techniques may improve central processing unit latency performance. For example, latency associated with media driver 114 may be reduced, for a batch depth of N, up to (N−1)/N (e.g., 75% for a batch depth of four, 87.5% for a batch depth of eight, and so on). Furthermore, latency associated with kernel mode driver 118 may be closely tied to object synchronization, if any, and may not be significantly impacted by such batching. Such latency reduction may substantially increase central processing unit performance in terms of power usage as it may allow the central processing unit to enter deeper sleep states for longer periods of time. Furthermore, such batching techniques may offer greater efficiency and parallelism processing via graphics processing unit 102.

Figure 3:
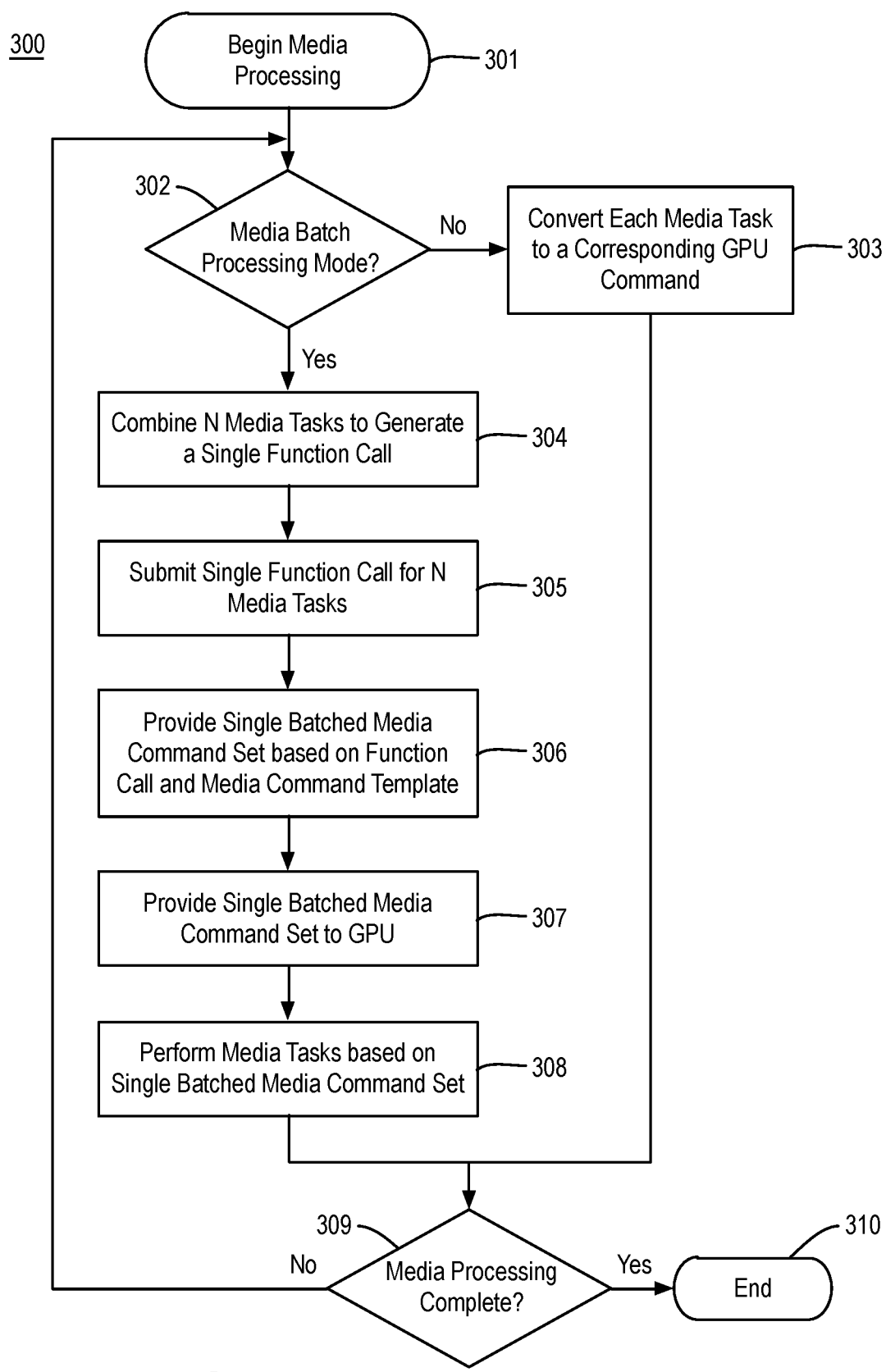
FIG. 3 is a flow diagram illustrating an example process for batching media tasks.

FIG. 3 is a flow diagram illustrating an example process 300 for batching media tasks, arranged in accordance with at least some implementations of the present disclosure. Process 300 may include one or more operations 301-310 as illustrated in FIG. 3. Process 300 or portions thereof may be performed by a device or system (e.g., system 100 or any other devices, systems, or subsystems discussed herein) to batch media tasks. Process 300 or portions thereof may be repeated for any number of media processing sessions or the like.

As shown, process 300 may begin at operation 301, where media processing may begin. For example, process 300 may initiate in response to a user initiating an application, a function within an application, or the like or process 300 may initiate in response to a processing initiation by a module or component of a system performing process 300 or the like.

Processing may continue at decision operation 302, where a determination may be made as to whether media processing is to be performed in a media batch processing mode. Such a determination may be made using any suitable technique or techniques. In an embodiment, batch processing may be selected by a user. In an embodiment, batch processing may be performed based on the application or application mode being processed. For example, batch processing may be performed based on a selection made by the application or in response to the application mode or type being run. For example, a slow motion video recording application or processing being performed, a continuous transcoding application or processing being performed, or the like. In some embodiments, batch processing may be performed based on conditions of the system performing process 300. For example, batch processing may be performed in a power savings mode of the system.

If batch processing is not being performed, processing may continue at operation 303, where each media task may be converted to a corresponding GPU command. For example, media middleware may provide a function call corresponding to each media task, a media driver may provide a graphics processor command corresponding to each function call, and each graphics processor command may be performed (e.g., without batching) by a graphics processing unit to generate media data. In such examples, processing may continue at decision operation 309 after a single media task is performed, after a predetermined number of media tasks have been performed, after a predetermined duration has lapsed, or until a flag or indicator or the like such as batch signal 141 is asserted. Decision operation 309 is discussed further herein below.

If batch processing is being performed, processing may continue at operation 304, where a number of media tasks (e.g., N) may be combined to generate a single function call as discussed herein. The number of combined media tasks (e.g., batch depth) may be any suitable number such as two, four, eight, or the like. The number of combined media tasks may be predetermined, generated based on the application or application mode being processed, or the like. As discussed, in the context of slow motion video recording, the batch depth may be ratio of the slow motion recording frame rate to a standard recording frame rate. The single function call may be generated by media middleware or the like using any suitable technique or techniques such as those discussed.

Processing may continue at operation 305, where the single function call for the multiple media tasks may be submitted. The single function call may be submitted using any suitable technique or techniques. In an embodiment, the single function call may be submitted by media middleware or the like to a media driver, user driver, or the like.

Processing may continue at operation 306, where a single batched media command set may be provided or generated based on the single function call and a media command template. For example, a media driver or the like may receive the single function call, switch to a command template structure based on the received the single function call including multiple media tasks, and generate the single batched media command set. For example, a media command template structure may provide a template such that the media driver may provide the appropriate parameters for the media command template. The media command template may be responsive to the single function call and/or the application or application mode being processed. The media command template structure may provide for the inclusion of media task independent parameters and media task dependent parameters as discussed herein. For example, for encode and/or decode tasks, the command template structure may include a structure for providing task independent parameters including a frame dimension, an initial quantization parameter, a slice structure for a frame, a slice quantization parameter bit depth, bit rate control settings, or the like. In an embodiment, the media driver may parse the single function call to determine parameters corresponding to the commands to be provided via the single batched media command set and the media driver may assemble the single batched media command set based on the parameters and the command template structure. For example, the media driver may populate the media command template structure based on the parsed parameters to generate the single batched media command set. The single batched media command set may have any suitable structure discussed herein.

Processing may continue at operation 307, where the single batched media command set may be provided to a graphics processor. For example, the media driver may provide the single batched media command set to a kernel mode driver, which may optionally perform object synchronization and may provide the single batched media command set to a direct memory access buffer. The graphics processor may retrieve or fetch the single batched media command set from the direct memory access buffer via a direct memory access engine.

Processing may continue at operation 308, where the media tasks may be performed by the graphics processor based on the single batched media command set. For example, as discussed, the graphics processor may retrieve the single batched media command set from the direct memory access buffer via a direct memory access engine and the graphics processor may launch the media tasks using the single batched media command set to generate output media data as discussed herein. In an embodiment, the graphics processor may launch and perform the media tasks via media task processors or cores or the like of the graphics processor.

Processing may continue from operation 308 or from operation 303 at decision operation 309, where a determination may be made as to whether media processing is complete. If so, processing may end at operation 310. If not, processing may continue at decision operation 302 as discussed herein. In other examples, processing from operation 303 may continue at operation 303 until an indicator or the like indicates batch processing is to progress or processing is complete. Or, similarly, processing from operation 308 may continue at operation 304 until an indicator or the like indicates batch processing is to no longer be provided or processing is complete. Furthermore, process 300 may be performed in series or in parallel for any number of media processing sessions.

Figure 4:
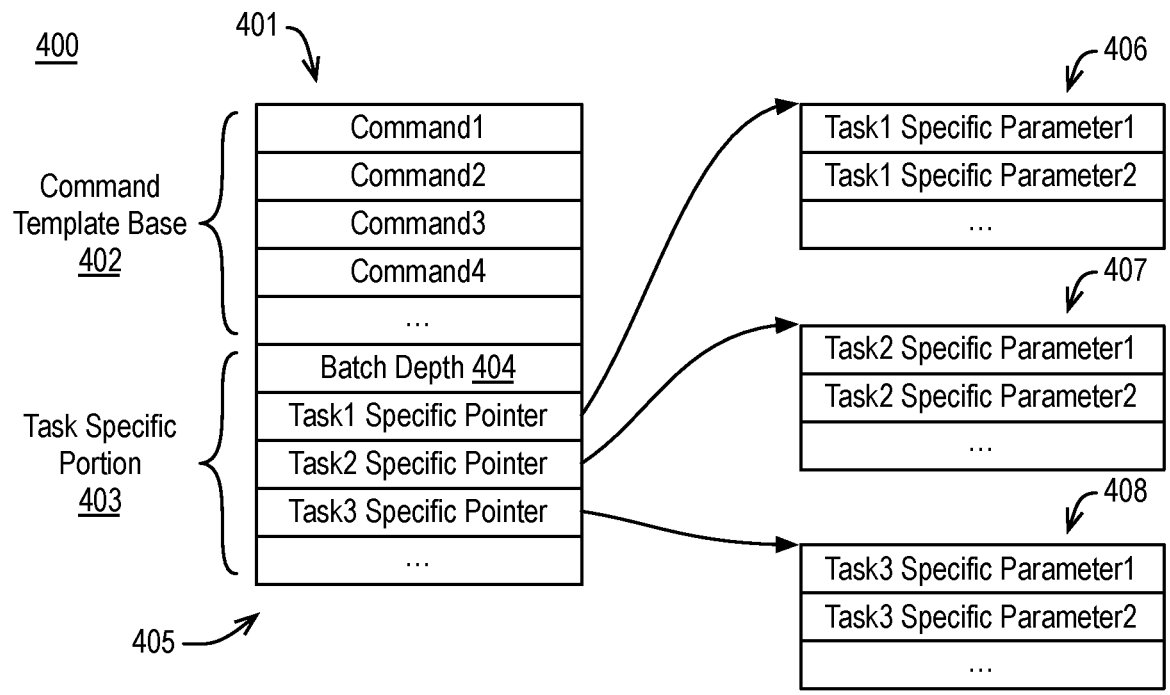
FIG. 4 illustrates an example batched media command template.

FIG. 4 illustrates an example batched media command template 400, arranged in accordance with at least some implementations of the present disclosure. As shown in FIG. 4, batched media command template 400 may include a command template base 402 in a first portion thereof and a task specific portion 403 in a second portion thereof. For example, in the context of FIG. 4, batched media command template 400 may be used to generate a batched media command set for launching via a graphics processor. As shown, batched media command template 400 may be populated with data or information to generate the batched media command set. In the context of FIG. 4, the discussed data structures may refer to a template to provide such data, parameters, information or the like and/or the batched media command set generated by populating the template with such data, parameters, information or the like.

For example, command template base 402 of batched media command template 400 may provide a template for inclusion of those commands and/or parameters shared among all media tasks represented by a batched media command set generated using batched media command template 400. Task specific portion 403 of batched media command template 400 may provide a template for inclusion of those commands, parameters, data, or the like (if any) specific to each particular media task of the media tasks represented by a batched media command set generated using batched media command template 400. For example, task specific portion 403 may provide inclusion of a batch depth 404 and pointers 405 to task specific parameters 406, 407, 408. For example, task specific parameters 406 may be associated with a first task of the media tasks, task specific parameters 407 may be associated with a second task of the media tasks, task specific parameters 408 may be associated with a third task of the media tasks, and so on. Although illustrated with respect to pointers 405, which may point to task specific parameters 406, 407, 408, in addition or in the alternative, a batched media command set generated using batched media command template 400 may include task specific parameters within task specific portion 403.

As shown, command template base 402 may provide a template for multiple commands 401 associated with the media tasks represented by the batched media command set generated using batched media command template 400. For example, commands 401 may include commands to be carried out for each of the media tasks represented by batched media command template 400. Furthermore, commands 401 may provide for inclusion of or include a parameter or parameters to be implemented for each and every of the media tasks. For example, such parameters may be task independent parameters in that they are to be utilized by each and every of the media tasks. Such parameters may include, for example, a frame dimension, an initial quantization parameter, a slice structure for a frame, a slice quantization parameter bit depth, bit rate control settings, a decoding bit depth, or the like. For example, a batched media command set generated using command template base 402 may include a single command set including commands 401 to launch the media tasks (e.g., graphics processor workloads) with those fields or templates filled with parameters common to all of the media tasks.

Furthermore, as discussed, another portion of batched media command template 400 may provide for inclusion of task dependent parameters, data, or information via task specific portion 403. As shown, task specific portion 403 may provide for the inclusion of batch depth 404 (e.g., the number of tasks batched in batched media command template 400) and task specific parameters or pointers 405 to task specific parameters 406, 407, 408. For example, one or more tasks represented by batched media command template 400 may have additional parameters for use during the performance or launching such tasks. As discussed, such additional parameters may be provided by batched media command template 400 (via task specific portion 403) or pointers 405 (as shown) may be provided to such additional parameters. For example, pointers 405 may point to memory locations where task specific parameters 406, 407, 408 may be retrieved. Such task specific parameters 406, 407, 408 may include any suitable information, parameters, or the like associated with particular media tasks. In an embodiment, task specific parameters 406, 407, 408 may include an input/output buffer address such as an address indicating where the data to be operated on may be found in memory and/or parameters that may change between tasks. For example, in the context of video encoding, media tasks may correspond to frames to be encoded and task specific parameters 406, 407, 408 may include parameters that may change on a frame by frame basis. As discussed, in some embodiments, task specific parameters 406, 407, 408 may provide additional parameters for performing media tasks. In addition or in the alternative, task specific parameters 406, 407, 408 may provide parameters that are to replace one ore more of those parameters provided via command template base 402.

Figure 5:
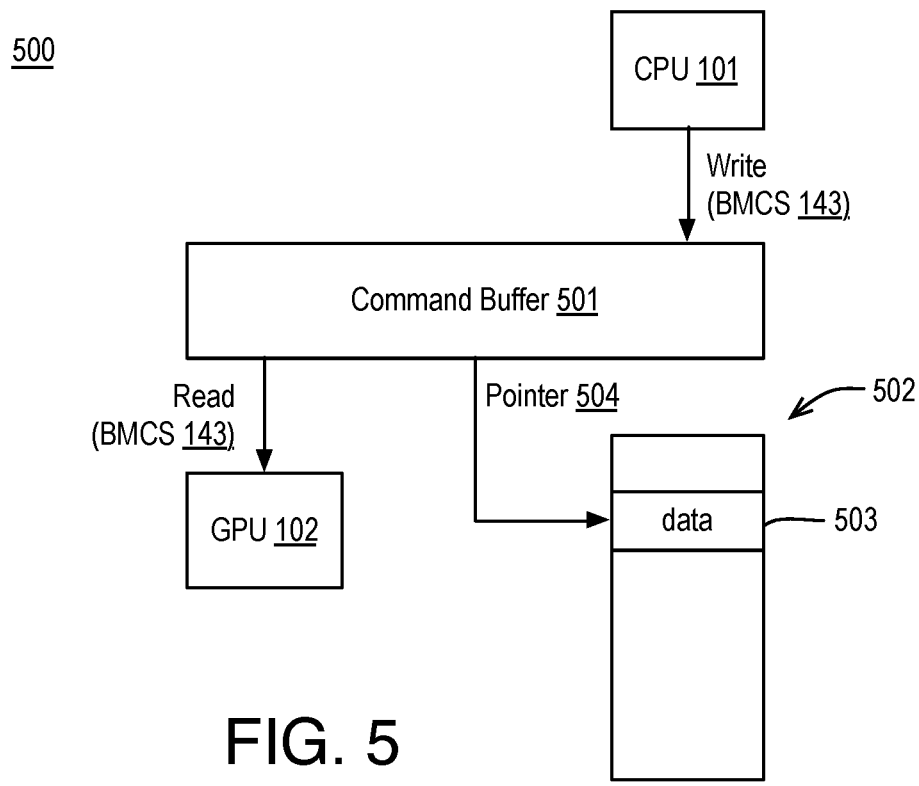
FIG. 5 illustrates an example system for providing communication between a central processing unit and a graphics processing unit to launch batched media workloads.

FIG. 5 illustrates an example system 500 for providing communication between a central processing unit and a graphics processing unit to launch batched media workloads, arranged in accordance with at least some implementations of the present disclosure. As shown in FIG. 5, system 500 may include central processing unit 101, graphics processing unit 102, a command buffer 501, and a memory 502. For example, as discussed, central processing unit 101 may batch media tasks, generate a single function call based on the batched media tasks, and provide batched media command set 143 based on parsing the single function call and assembling batched media command set 143 using or based on a media command template such as batched media command template 400.

As shown, central processing unit 101 may write batched media command set 143 to command buffer 501, which may be implemented via any suitable memory such as shared memory between central processing unit 101 and graphics processing unit 102. In an embodiment, command buffer 501 may be implemented via memory 502. Graphics processing unit 102 may read batched media command set 143 via the command buffer 501 and graphics processing unit 102 may launch the media tasks corresponding to batched media command set 143 as discussed herein. Furthermore, as shown, one or more media tasks in media command set 143 may provide a pointer 504 to data 503 stored in memory 502. For example, graphics processing unit 102 may retrieve data 503 for a particular media task via memory 502 to implement the media task. In an embodiment, pointer 504 may be provided via a task specific portion of batched media command set 143. For example, data 503 may be retrieved based on pointer 504 including an input/output buffer address referencing a memory location within memory 502.

Graphics processing unit 102 may launch media tasks based on media command set 143 as discussed herein to process data 503 and to generate output media data (not shown). Such output media data may be stored in memory 502, provided to another component for processing, or the like. For example, such output media data may include a bitstream or a portion thereof, a frame of video or a portion thereof, or the like.

Figure 6:
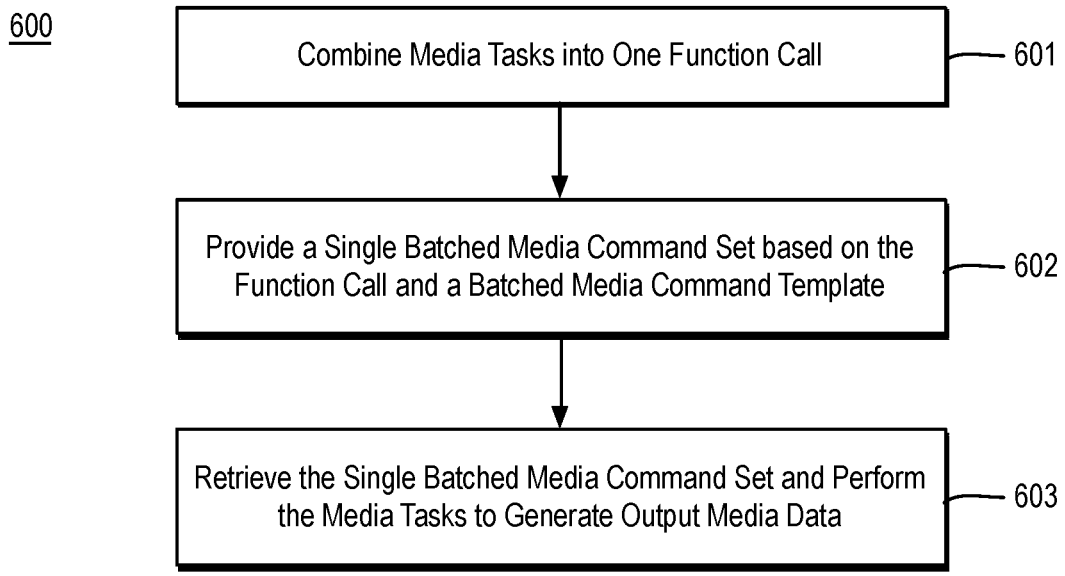
FIG. 6 is a flow diagram illustrating an example process for batching media tasks.

FIG. 6 is a flow diagram illustrating an example process 600 for batching media tasks, arranged in accordance with at least some implementations of the present disclosure. Process 600 may include one or more operations 601-603 as illustrated in FIG. 6. Process 600 may form at least part of a media task batching process. By way of non-limiting example, process 600 may form at least part of a media task batching process as performed by any device or system as discussed herein. Furthermore, process 600 will be described herein with reference to system 700 of FIG. 7.

Figure 7:
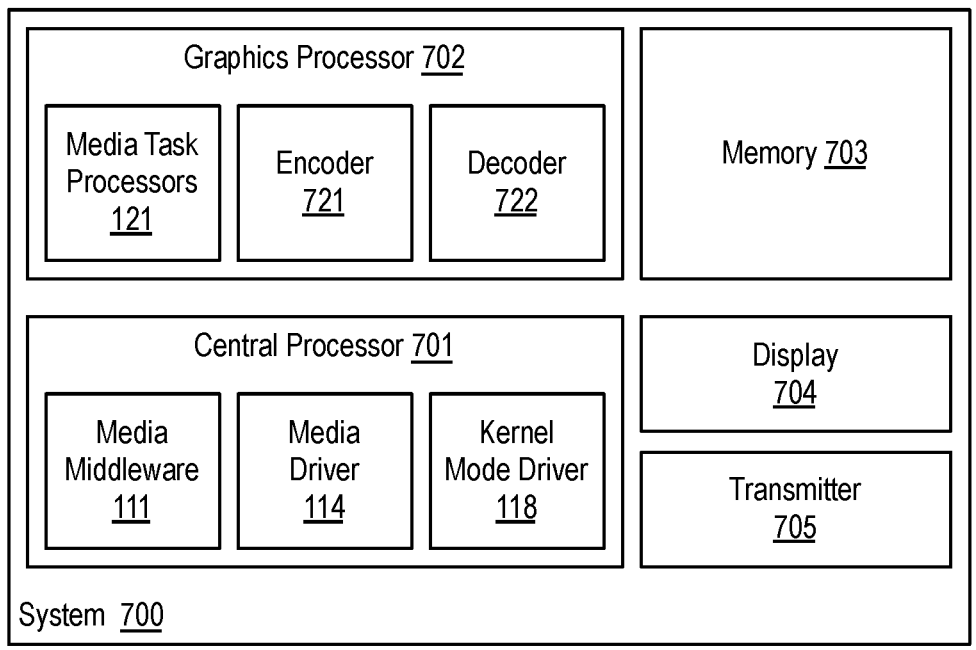
FIG. 7 is an illustrative diagram of an example system for batching media tasks.

FIG. 7 is an illustrative diagram of an example system 700 for batching media tasks, arranged in accordance with at least some implementations of the present disclosure. As shown in FIG. 7, system 700 may include a central processor 701, a graphics processor 702, memory 703, a display 704, and a transmitter 705. Also as shown, central processor 701 may include or implement media middleware 111, media driver 114, and kernel mode driver 118 and graphics processor 702 may include or implement media task processors 121, an encoder 721, and a decoder 722. In the example of system 700, memory 703 may store media task batching data or related content such as video frames, bitstream data, batching mode data, media task data, function calls, parsed parameters, assembled parameters, batched media command templates, batched media command set(s), task independent parameters, task specific parameters, pointers to task specific parameters, and/or any other data as discussed herein.

As shown, in some examples, media middleware 111, media driver 114, and kernel mode driver 118 may be implemented via central processor 701. In other examples, one or more or portions media middleware 111, media driver 114, and kernel mode driver 118 may be implemented via graphics processor 702, or another processing unit. Furthermore, as shown, in some examples, media task processors 121, encoder 721, and decoder 722 may be implemented via graphics processor 702. In other examples, media task processors 121, encoder 721, and decoder 722 or portions thereof may be implemented via or another processing unit such as dedicated hardware.

Graphics processor 702 may include any number and type of graphics processing units that may provide the operations as discussed herein. Such operations may be implemented via software or hardware or a combination thereof. For example, graphics processor 702 may include circuitry dedicated to manipulate video frames, video data, image data, bitstream data, or the like obtained from memory 703. Central processor 701 may include any number and type of processing units or modules that may provide control and other high level functions for system 700 and/or provide any operations as discussed herein. Memory 703 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 703 may be implemented by cache memory.

In an embodiment, media task processors 121, encoder 721, and decoder 722 or portions thereof may be implemented via an execution unit (EU) of graphics processor 702. The EU may include, for example, programmable logic or circuitry such as a logic core or cores that may provide a wide array of programmable logic functions. In an embodiment, media task processors 121, encoder 721, and decoder 722 or portions thereof may be implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 6, process 600 may begin at operation 601, where multiple media tasks may be combined into one function call comprising the media tasks. For example, the multiple media tasks may be combined into one function call comprising the media tasks in a media task batching mode. The multiple media tasks may be combined into one function call using any suitable technique or techniques. In an embodiment, media middleware 111 as implemented via central processor 701 may combine the multiple media tasks into one function call. The multiple media tasks may include any suitable media tasks such as an encoding task, a decoding task, or an encoding task. Furthermore, the media task batching mode may be determined or entered into using any suitable technique or techniques. In an embodiment, the media task batching mode may be determined or entered into based on an application mode associated with the multiple media tasks. For example, the application mode may be a slow motion video recording mode, a transcoding mode, or the like. In some embodiments, the function call may include a task depth corresponding to the multiple media tasks.

Processing may continue at operation 602, where a single batched media command set for the media tasks may be provided based on the one function call and a batched media command template. The single batched media command set may be provided using any suitable technique or techniques. In an embodiment, the single batched media command set may be provided by media driver 114 as implemented via central processor 701. In an embodiment, providing the single batched media command set may be provided responsive to the task depth, which may be provide via the function call, as discussed, or separately from the function call.

In an embodiment, providing the single batched media command set may include parsing parameters of the one function call and assembling a first portion of the single batched media command set including task independent parameters corresponding to each of the plurality of media tasks. Furthermore, a second portion of the single batched media command set may be assembled such that the second portion includes a task specific parameter corresponding to one of multiple media tasks or at least one pointer to the task specific parameter. For example, assembling the first and second portions may include assembling parameters within a command template base and a task specific portion, respectively, of a batched media command template. The task independent and task specific parameters may include an suitable parameters for launching and performing the multiple media tasks. In an embodiment, the task independent parameters include at least one of a frame dimension, an initial quantization parameter, a slice structure for a frame, a slice quantization parameter bit depth, bit rate control settings, or a decoding bit depth. In an embodiment, the task specific parameter(s) include an input/output buffer address corresponding to one of the plurality of media tasks.

Processing may continue at operation 603, where the single batched media command set may be retrieved by a graphics processor and the and the graphics processor may perform the multiple media tasks based on the single batched media command set to generate output media data. The single batched media command set may be retrieved and the multiple media tasks may be performed using any suitable technique or techniques. In an embodiment, graphics processor 702 may retrieve the single batched media command set (e.g., via a direct memory access engine) and graphics processor 702 may perform the multiple media tasks to generate the media data. In an embodiment, one or more of the multiple media tasks may be performed by media task processors 121 of graphics processing unit 102. In the context of video frame encoding, one or more of the multiple media tasks may be performed by encoder 721 of graphics processing unit 102. In the context of video transcoding, one or more of the multiple media tasks may be performed by decoder 722 and/or encoder 721 of graphics processing unit 102. For example, a bitstream or portions thereof may be decoded by decoder 722 to generate video frames, which may be encoded by encoder 721 to generate a bitstream or portions thereof (e.g., a bitstream of a different format). Furthermore, display 704 may display decoded video frames and transmitter 705 may transmit decoded video frames and/or a coded bitstream.

Process 600 may be repeated any number of times either in series or in parallel for any number media task batches or the like. As discussed, process 600 may provide for batching media tasks for any suitable media processing context. For example, the discussed techniques for batching encode tasks may provide computationally efficient and low power media content processing.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. In other examples, various components of the systems or devices discussed herein may be provided in a platform as may be found in a server, computer, cloud computing resource, or the like.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the processes or any operations discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 8:
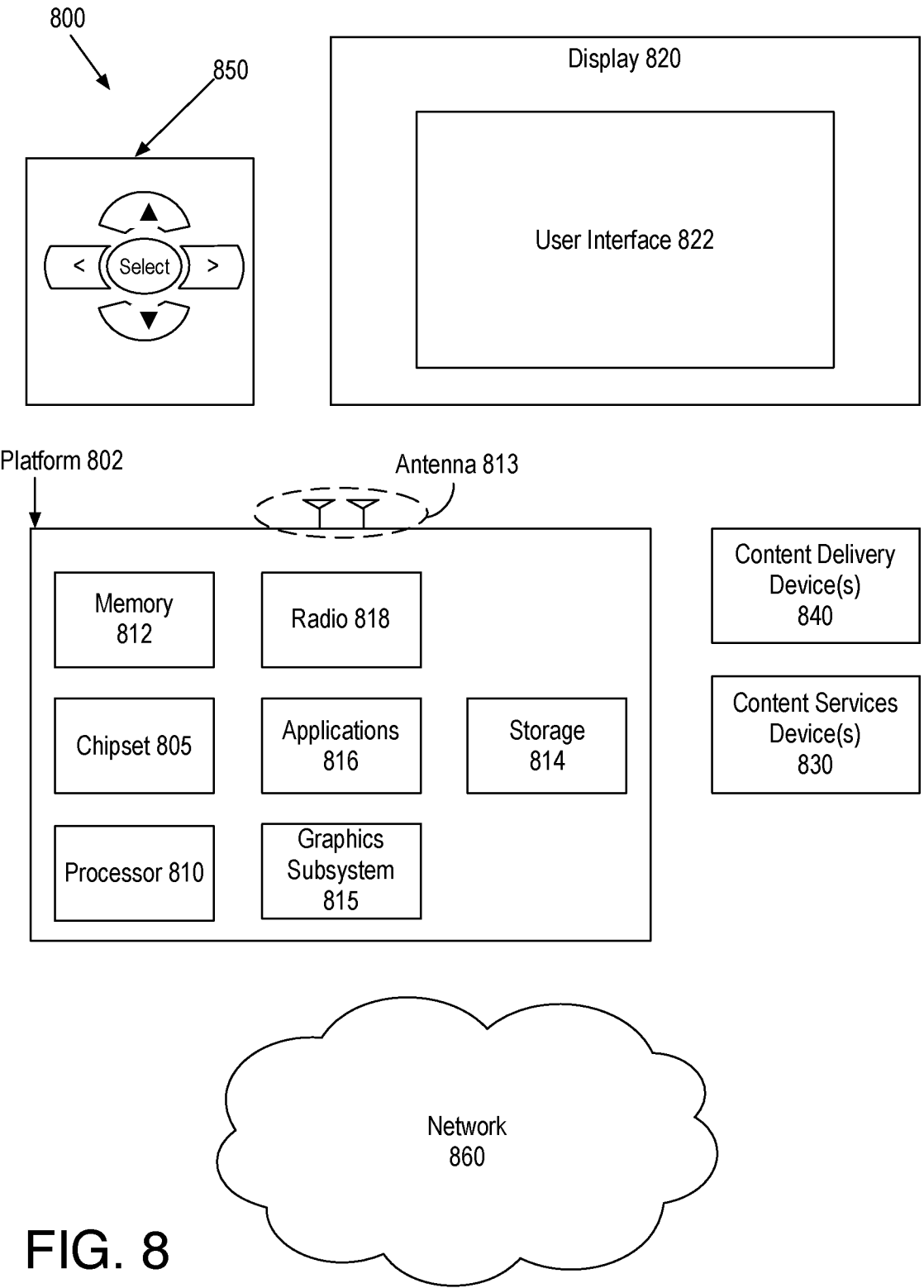
FIG. 8 is an illustrative diagram of an example system.

FIG. 8 is an illustrative diagram of an example system 800, arranged in accordance with at least some implementations of the present disclosure. In various implementations, system 800 may be a mobile device or a server device although system 800 is not limited to this context. For example, system 800 may be incorporated into a server system, cloud computing resource, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, camera, and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of uni-directionally or bi-directionally communicating content between content providers and platform 802 and/display 820, via network 860 or directly. It will be appreciated that the content may be communicated uni-directionally and/or bi-directionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In various embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
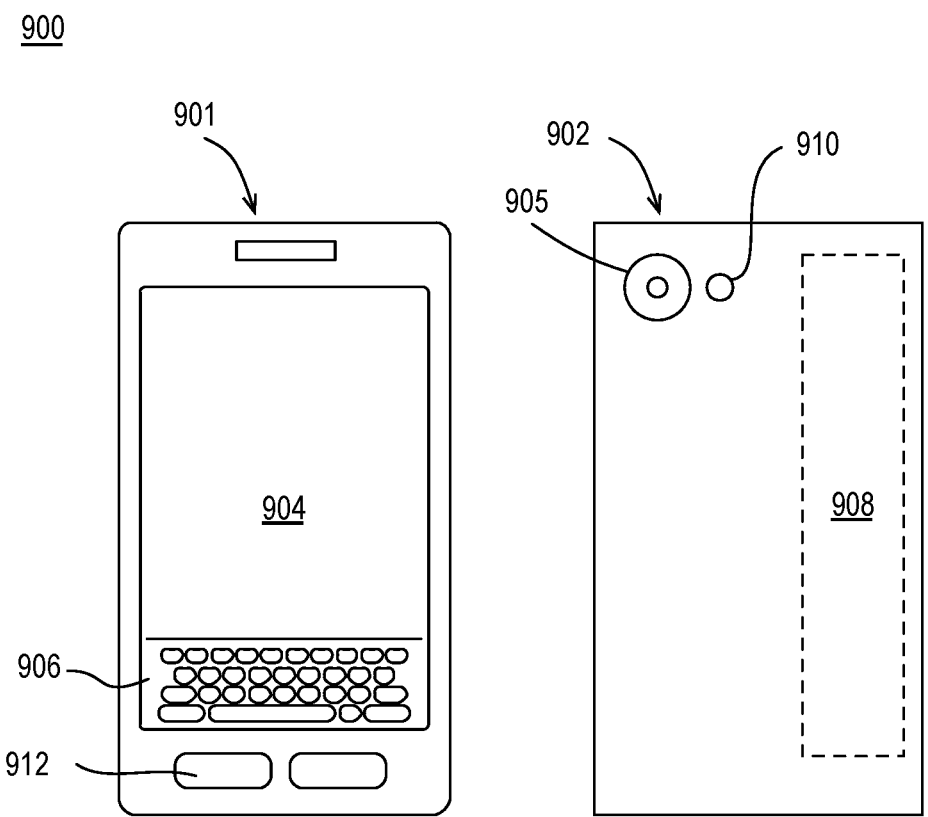
FIG. 9 illustrates an example device, all arranged in accordance with at least some implementations of the present disclosure.

As described above, system 800 may be embodied in varying physical styles or form factors. FIG. 9 illustrates an example small form factor device 900, arranged in accordance with at least some implementations of the present disclosure. In some examples, system 800 may be implemented via device 900. In other examples, system 100 or any other systems, devices, or operations discussed herein may be implemented via device 900. In various embodiments, for example, device 900 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing with a front 901 and a back 902. Device 900 includes a display 904, an input/output (I/O) device 906, and an integrated antenna 908. Device 900 also may include navigation features 912. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. As shown, device 900 may include a camera 905 (e.g., including a lens, an aperture, and an imaging sensor) and a flash 910 integrated into back 902 (or elsewhere) of device 900. In other examples, camera 905 and flash 910 may be integrated into front 901 of device 900 or both front and back cameras may be provided. Camera 905 and flash 910 may be components of a camera module to originate image data processed into streaming video that is output to display 904 and/or communicated remotely from device 900 via antenna 908 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a system for batching media tasks comprises a memory comprising a buffer for storing batched media command sets, a central processor coupled to the memory, the central processor to, in a media task batching mode, combine a plurality of media tasks into one function call comprising the media tasks, to provide, via a media driver, a single batched media command set for the media tasks based on the one function call and a batched media command template, and to store the single batched media command set to the buffer, and a graphics processor to retrieve the single batched media command set and to perform the plurality of media tasks based on the single batched media command set to generate output media data.

Further to the first embodiments, the one function call further comprises a task depth corresponding to the plurality of media tasks and the central processor to provide the single batched media command set is responsive to the task depth.

Further to the first embodiments, the central processor to provide the single batched media command set comprises the central processor to parse parameters of the one function call and to assemble a first portion of the single batched media command set comprising task independent parameters corresponding to each of the plurality of media tasks.

Further to the first embodiments, the central processor to provide the single batched media command set comprises the central processor to parse parameters of the one function call and to assemble a first portion of the single batched media command set comprising task independent parameters corresponding to each of the plurality of media tasks, and the central processor is further to assemble a second portion of the single batched media command set comprising at least one task specific parameter corresponding to one of the plurality of media tasks or at least one pointer to the task specific parameter.

Further to the first embodiments, the central processor to provide the single batched media command set comprises the central processor to parse parameters of the one function call and to assemble a first portion of the single batched media command set comprising task independent parameters corresponding to each of the plurality of media tasks, and the central processor is further to assemble a second portion of the single batched media command set comprising at least one task specific parameter corresponding to one of the plurality of media tasks or at least one pointer to the task specific parameter, wherein the task independent parameters comprise at least one of a frame dimension, an initial quantization parameter, a slice structure for a frame, a slice quantization parameter bit depth, bit rate control settings, or a decoding bit depth.

Further to the first embodiments, the central processor to provide the single batched media command set comprises the central processor to parse parameters of the one function call and to assemble a first portion of the single batched media command set comprising task independent parameters corresponding to each of the plurality of media tasks, and the central processor is further to assemble a second portion of the single batched media command set comprising at least one task specific parameter corresponding to one of the plurality of media tasks or at least one pointer to the task specific parameter, wherein the task specific parameter comprises an input/output buffer address corresponding to one of the plurality of media tasks.

Further to the first embodiments, the central processor to provide the single batched media command set comprises the central processor to parse parameters of the one function call and to assemble a first portion of the single batched media command set comprising task independent parameters corresponding to each of the plurality of media tasks, and the central processor is further to assemble a second portion of the single batched media command set comprising at least one task specific parameter corresponding to one of the plurality of media tasks or at least one pointer to the task specific parameter, wherein the task independent parameters comprise at least one of a frame dimension, an initial quantization parameter, a slice structure for a frame, a slice quantization parameter bit depth, bit rate control settings, or a decoding bit depth and/or wherein the task specific parameter comprises an input/output buffer address corresponding to one of the plurality of media tasks.

Further to the first embodiments, the plurality of media tasks comprise at least one of an encoding task, a decoding task, or a transcoding task.

Further to the first embodiments, the central processor is further to enter the media task batching mode based on an application mode associated with the plurality of media tasks.

Further to the first embodiments, the central processor is further to enter the media task batching mode based on an application mode associated with the plurality of media tasks, wherein the application mode comprises at least one of a slow motion video recording mode or a video transcoding mode.

Further to the first embodiments, the plurality of media tasks comprise at least one of an encoding task, a decoding task, or a transcoding task, the central processor is further to enter the media task batching mode based on an application mode associated with the plurality of media tasks, and the application mode comprises at least one of a slow motion video recording mode or a video transcoding mode.

In one or more second embodiments, a method for batching media tasks comprises combining, in a media task batching mode, a plurality of media tasks into one function call comprising the media tasks, providing, by a media driver, a single batched media command set for the media tasks based on the one function call and a batched media command template, and retrieving, by a graphics processor, the single batched media command set and performing the plurality of media tasks based on the single batched media command set to generate output media data.

Further to the second embodiments, the one function call further comprises a task depth corresponding to the plurality of media tasks and providing the single batched media command set is responsive to the task depth.

Further to the second embodiments, providing the single batched media command set for the media tasks comprises parsing parameters of the one function call and assembling a first portion of the single batched media command set comprising task independent parameters corresponding to each of the plurality of media tasks.

Further to the second embodiments, providing the single batched media command set for the media tasks comprises parsing parameters of the one function call and assembling a first portion of the single batched media command set comprising task independent parameters corresponding to each of the plurality of media tasks and the method further comprises assembling a second portion of the single batched media command set comprising at least one task specific parameter corresponding to one of the plurality of media tasks or at least one pointer to the task specific parameter.

Further to the second embodiments, providing the single batched media command set for the media tasks comprises parsing parameters of the one function call and assembling a first portion of the single batched media command set comprising task independent parameters corresponding to each of the plurality of media tasks and the method further comprises assembling a second portion of the single batched media command set comprising at least one task specific parameter corresponding to one of the plurality of media tasks or at least one pointer to the task specific parameter, wherein the task independent parameters comprises at least one of a frame dimension, an initial quantization parameter, a slice structure for a frame, a slice quantization parameter bit depth, bit rate control settings, or a decoding bit depth.

Further to the second embodiments, providing the single batched media command set for the media tasks comprises parsing parameters of the one function call and assembling a first portion of the single batched media command set comprising task independent parameters corresponding to each of the plurality of media tasks and the method further comprises assembling a second portion of the single batched media command set comprising at least one task specific parameter corresponding to one of the plurality of media tasks or at least one pointer to the task specific parameter, wherein the task specific parameter comprises an input/output buffer address corresponding to one of the plurality of media tasks.

Further to the second embodiments, providing the single batched media command set for the media tasks comprises parsing parameters of the one function call and assembling a first portion of the single batched media command set comprising task independent parameters corresponding to each of the plurality of media tasks and the method further comprises assembling a second portion of the single batched media command set comprising at least one task specific parameter corresponding to one of the plurality of media tasks or at least one pointer to the task specific parameter, wherein the task independent parameters comprises at least one of a frame dimension, an initial quantization parameter, a slice structure for a frame, a slice quantization parameter bit depth, bit rate control settings, or a decoding bit depth and/or the task specific parameter comprises an input/output buffer address corresponding to one of the plurality of media tasks.

Further to the second embodiments, the plurality of media tasks comprise at least one of an encoding task, a decoding task, or a transcoding task.

Further to the second embodiments, the method further comprises entering the media task batching mode based on an application mode associated with the plurality of media tasks.

Further to the second embodiments, the method further comprises entering the media task batching mode based on an application mode associated with the plurality of media tasks, wherein the application mode comprises at least one of a slow motion video recording mode or a transcoding mode.

Further to the second embodiments, the method further comprises entering the media task batching mode based on an application mode associated with the plurality of media tasks, wherein the application mode comprises at least one of a slow motion video recording mode or a transcoding mode.

In one or more third embodiments, a system comprises means for combining, in a media task batching mode, a plurality of media tasks into one function call comprising the media tasks, means for providing a single batched media command set for the media tasks based on the one function call and a batched media command template, and means for performing the plurality of media tasks based on the single batched media command set to generate output media data.

Further to the third embodiments, the one function call further comprises a task depth corresponding to the plurality of media tasks and the means for providing the single batched media command set are responsive to the task depth.

Further to the third embodiments, the means for providing the s single batched media command set for the media tasks comprise means for parsing parameters the one function call and means for assembling a first portion of the single batched media command set comprising task independent parameters corresponding to each of the plurality of media tasks.

Further to the third embodiments, the means for providing the s single batched media command set for the media tasks comprise means for parsing parameters the one function call and means for assembling a first portion of the single batched media command set comprising task independent parameters corresponding to each of the plurality of media tasks, and the system further comprises means for assembling a second portion of the single batched media command set comprising at least one task specific parameter corresponding to one of the plurality of media tasks or at least one pointer to the task specific parameter.

Further to the third embodiments, the means for providing the s single batched media command set for the media tasks comprise means for parsing parameters the one function call and means for assembling a first portion of the single batched media command set comprising task independent parameters corresponding to each of the plurality of media tasks, and the system further comprises means for assembling a second portion of the single batched media command set comprising at least one task specific parameter corresponding to one of the plurality of media tasks or at least one pointer to the task specific parameter, wherein the task independent parameters comprises at least one of a frame dimension, an initial quantization parameter, a slice structure for a frame, a slice quantization parameter bit depth, bit rate control settings, or a decoding bit depth.

In one or more fourth embodiments, at least one machine readable medium comprises a plurality of instructions that, in response to being executed on a computing device, cause the computing device to batch media tasks by combining, in a media task batching mode, a plurality of media tasks into one function call comprising the media tasks, providing, by a media driver, a single batched media command set for the media tasks based on the one function call and a batched media command template, and providing, by a media driver, a single batched media command set for the media tasks based on the one function call and a batched media command template.

Further to the fourth embodiments, the one function call further comprises a task depth corresponding to the plurality of media tasks and providing the single batched media command set is responsive to the task depth.

Further to the fourth embodiments, providing the single batched media command set for the media tasks comprises parsing parameters of the one function call and assembling a first portion of the single batched media command set comprising task independent parameters corresponding to each of the plurality of media tasks.

Further to the fourth embodiments, providing the single batched media command set for the media tasks comprises parsing parameters of the one function call and assembling a first portion of the single batched media command set comprising task independent parameters corresponding to each of the plurality of media tasks and the machine readable medium further comprises instructions that, in response to being executed on the computing device, cause the computing device to batch media tasks by assembling a second portion of the single batched media command set comprising at least one task specific parameter corresponding to one of the plurality of media tasks or at least one pointer to the task specific parameter.

Further to the fourth embodiments, providing the single batched media command set for the media tasks comprises parsing parameters of the one function call and assembling a first portion of the single batched media command set comprising task independent parameters corresponding to each of the plurality of media tasks and the machine readable medium further comprises instructions that, in response to being executed on the computing device, cause the computing device to batch media tasks by assembling a second portion of the single batched media command set comprising at least one task specific parameter corresponding to one of the plurality of media tasks or at least one pointer to the task specific parameter, wherein the task independent parameters comprises at least one of a frame dimension, an initial quantization parameter, a slice structure for a frame, a slice quantization parameter bit depth, bit rate control settings, or a decoding bit depth.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for batching media tasks comprising:
   combining, in a media task batching mode, a plurality of media tasks into one function call comprising the media tasks;
   providing, by a media driver, a single batched media command set for the media tasks based on the one function call and a batched media command template by parsing parameters of the one function call and assembling a first portion of the single batched media command set comprising task independent parameters corresponding to each of the plurality of media tasks; and
   retrieving, by a graphics processor, the single batched media command set and performing the plurality of media tasks based on the single batched media command set to generate output media data.

2. The method of claim 1, wherein the one function call further comprises a task depth corresponding to the plurality of media tasks and providing the single batched media command set is responsive to the task depth.

3. The method of claim 1, further comprising assembling a second portion of the single batched media command set comprising at least one task specific parameter corresponding to one of the plurality of media tasks or at least one pointer to the task specific parameter.

4. The method of claim 3, wherein the task specific parameter comprises an input/output buffer address corresponding to one of the plurality of media tasks.

5. The method of claim 1, wherein the task independent parameters comprises at least one of a frame dimension, an initial quantization parameter, a slice structure for a frame, a slice quantization parameter bit depth, bit rate control settings, or a decoding bit depth.

6. The method of claim 1, wherein the plurality of media tasks comprise at least one of an encoding task, a decoding task, or a transcoding task.

7. The method of claim 1, further comprising entering the media task batching mode based on an application mode associated with the plurality of media tasks.

8. The method of claim 7, wherein the application mode comprises at least one of a slow motion video recording mode or a transcoding mode.

9. A system for batching media tasks comprising:
a memory comprising a buffer for storing batched media command sets;
a central processor coupled to the memory, the central processor to, in a media task batching mode, combine a plurality of media tasks into one function call comprising the media tasks, to provide, via a media driver, a single batched media command set for the media tasks based on the one function call and a batched media command template by the central processor to parse parameters of the one function call and to assemble a first portion of the single batched media command set comprising task independent parameters corresponding to each of the plurality of media tasks, and to store the single batched media command set to the buffer; and
a graphics processor to retrieve the single batched media command set and to perform the plurality of media tasks based on the single batched media command set to generate output media data.

10. The system of claim 9, wherein the one function call further comprises a task depth corresponding to the plurality of media tasks and wherein the central processor to provide the single batched media command set is responsive to the task depth.

11. The system of claim 9, the central processor further to assemble a second portion of the single batched media command set comprising at least one task specific parameter corresponding to one of the plurality of media tasks or at least one pointer to the task specific parameter.

12. The system of claim 11, wherein the task specific parameter comprises an input/output buffer address corresponding to one of the plurality of media tasks.

13. The system of claim 9, wherein the task independent parameters comprises at least one of a frame dimension, an initial quantization parameter, a slice structure for a frame, a slice quantization parameter bit depth, bit rate control settings, or a decoding bit depth.

14. The system of claim 9, wherein the plurality of media tasks comprise at least one of an encoding task, a decoding task, or a transcoding task.

15. The system of claim 9, wherein the central processor is further to enter the media task batching mode based on an application mode associated with the plurality of media tasks.

16. The system of claim 15, wherein the application mode comprises at least one of a slow motion video recording mode or a video transcoding mode.

17. At least one non-transitory machine readable medium comprising a plurality of instructions that, in response to being executed on a computing device, cause the computing device to batch media tasks by:
combining, in a media task batching mode, a plurality of media tasks into one function call comprising the media tasks;
providing, by a media driver, a single batched media command set for the media tasks based on the one function call and a batched media command template by parsing parameters of the one function call and assembling a first portion of the single batched media command set comprising task independent parameters corresponding to each of the plurality of media tasks; and
retrieving, by a graphics processor, the single batched media command set and performing the plurality of media tasks based on the single batched media command set to generate output media data.

18. The non-transitory machine readable medium of claim 17, wherein the one function call further comprises a task depth corresponding to the plurality of media tasks and providing the single batched media command set is responsive to the task depth.

19. The non-transitory machine readable medium of claim 17, further comprising instructions that, in response to being executed on the computing device, cause the computing device to batch media tasks by assembling a second portion of the single batched media command set comprising at least one task specific parameter corresponding to one of the plurality of media tasks or at least one pointer to the task specific parameter.

20. The non-transitory machine readable medium of claim 19, wherein the task independent parameters comprises at least one of a frame dimension, an initial quantization parameter, a slice structure for a frame, a slice quantization parameter bit depth, bit rate control settings, or a decoding bit depth.

21. The non-transitory machine readable medium of claim 17, wherein the task independent parameters comprises at least one of a frame dimension, an initial quantization parameter, a slice structure for a frame, a slice quantization parameter bit depth, bit rate control settings, or a decoding bit depth.

22. The non-transitory machine readable medium of claim 17, wherein the plurality of media tasks comprise at least one of an encoding task, a decoding task, or a transcoding task.

23. The non-transitory machine readable medium of claim 17, further comprising instructions that, in response to being executed on the computing device, cause the computing device to batch media tasks by entering the media task batching mode based on an application mode associated with the plurality of media tasks.

* * * * *